United States Patent [19]

Tulip

[11] Patent Number: 5,048,034

[45] Date of Patent: Sep. 10, 1991

[54] LONG WAVELENGTH NDYAG LASER

[75] Inventor: John Tulip, Edmonton, Canada

[73] Assignee: Carl Zeiss Stiftung, Fed. Rep. of Germany

[21] Appl. No.: 933,103

[22] Filed: Nov. 20, 1986

[51] Int. Cl.$^5$ .............................................. H01S 3/16
[52] U.S. Cl. ...................................... 372/41; 372/20; 372/99; 372/107
[58] Field of Search ...................... 372/41, 107, 92, 20, 372/23, 99, 100, 101

[56] References Cited

U.S. PATENT DOCUMENTS

| | | | |
|---|---|---|---|
| 3,270,290 | 8/1966 | Maurer | 331/94.5 |
| 3,569,859 | 3/1971 | Whitney | 531/94.5 |
| 3,675,154 | 7/1972 | Duguay et al. | 331/94.5 |
| 3,860,888 | 1/1975 | Stephens | 331/94.5 C |
| 4,233,567 | 11/1980 | Chernoch | 531/94.5 P |
| 4,441,186 | 4/1984 | Erickson | 372/19 |

FOREIGN PATENT DOCUMENTS

| | | |
|---|---|---|
| 2809007 | 9/1979 | Fed. Rep. of Germany . |
| 3335317A1 | 4/1984 | Fed. Rep. of Germany . |
| 1042312 | 9/1966 | United Kingdom . |
| 1201594 | 8/1970 | United Kingdom . |
| 1308863 | 3/1973 | United Kingdom . |
| 1402438 | 8/1975 | United Kingdom . |

OTHER PUBLICATIONS

An article entitled "The Neodymium Laser", by Jeff Hecht published at pp. 57–62 in the Nov. 1983 edition of Lasers and Applications.
An article entitled "The Dazzle of Lasers", published at pp. 36–40 in the Jan. 3, 1986 edition of Newsweek.
An article entitled "Analytical Model of a C-W YAG Laser", by Walter Koechner, published Apr. 1970 in Laser Focus Magazine.
An article entitled "1.05–1.44 Micrometer Tunable High Power Emission on 18 CW Transistions in Nd:YAG", by Jack Marlin published at pp. 94d–95d of vol. 13, No. 9 of the IEEE Journal of Quantum Electronics.
An article entitled "1.05–1.44 Micrometer Tunability and Performance of the CW Nd:YAG Laser", by Jack Marlin appearing at pp. 56–62 in vol. 14, No. 1 of the Jan. 1978 edition of IEEE Journal of Quantum Electronics.
An article entitled "Absorbtion of Radiation by Pure Liquid Water", appearing at p. 192 in the Handbook of Marine Science.
An article entitled "Laser Applications in Microsurgery", by S. K. Davi published at pp. 73–78 in the Oct. 1983 edition of Lasers and Applications.
An article entitled "Thermal Action of Laser Irridation in Biological Material Monitored by Eggwhite Coagulation", appearing at pp. 822–825 of vol. 20, No. 5 of the Mar. 1, 1985 edition of Applied Optics.
An article entitled "Observations on the Simultaneous Use of $CO_2$ and Nd:YAG Lasers in Neurosurgery", appearing at pp. 155–161 of the 1982 edition of Lasers in Surgery and Medicine.
An article entitled "Experimental Study of Partial Liver Resection with a combined $CO_2$ and Nd-YAG Laser", appearing at pp. 149–154 of the 1982 edition of Lasers in Surgery and Medicine.

(List continued on next page.)

*Primary Examiner*—Frank Gonzalez
*Attorney, Agent, or Firm*—Andrus, Sceales, Starke & Sawall

[57] ABSTRACT

A long wavelength NdYAG laser which is operable either in a surgical cutting mode where the wavelength of laser radiation is about 1.44 micrometers, or in a therapeutic coagulating mode where the wavelength of laser radiation is about 1.06 micrometers. The NdYAG laser combines the use of frequency selective laser mirrors together with a repetitively pulsed high peak current lamp to produce high laser power at both 1.44 micrometers and 1.06 micrometers. The NdYAG laser beam may also be coupled to and transmitted by a flexible fiber optic quartz cable so that both the coagulating 1.06 micrometer beam and the cutting 1.44 micrometer beam may be transmitted through the same fiberoptic cable.

23 Claims, 1 Drawing Sheet

OTHER PUBLICATIONS

A copy of a two page advertising brochure published by Laser Industries and entitled "Sharplan 2100".

A copy of a six page advertising brochure entitled "NdYAG Laser Model 8000", published by Molectron Medical.

A five page advertising brochure entitled "Convertible YAG Laser", published by Lasermetrics.

A copy of a single page advertising brochure entitled "NIIC Presents".

A copy of a single page advertising brochure entitled "Tomorrow's Technology for Medicine Today", published by MBB-Medizintechnic GmbH.

"1.05-1.44 μm tunability and Performance of the CW NdYAG Laser", by Jack Marling, pp. 55-62, vol. 14, No. 1, Jan. 1978 edition of IEEE Journal of Quantum Electronics.

"Mirrors and Coatings for Vacuum UV and UV Lasers", by Stelmack et al., published at pp. 41-46, vol. 12, No. 11 of EOSD Electro-Optical Systems Design dated Nov. 1980.

"New Room Temperature CW Laser Transitions in YalG: Nd", by Smith published at pp. 505-506 of vol. 4, No. 8 of IEEE Journal of Quantum Electronics, Aug. 1968.

"Multibeam Lasers", by Kaminski at pp. 1911-1912, vol. 10, No. 12, May 1975 of Inorganic Materials.

"Tunable Coherent Radiation from the UV to the IR Range by Dye Lasers with frequency Conversion", by Appt et al., published in Feinwertechnik and Messtechnik, 83rd volume, issue 2, Feb./Mar. 1975, pp. 33-39.

"A Microprocessor-Controlled Laser Grating System for Laser Tuning", by Daneshvar-Hosseini et al., Jun. 1982. edition of Optics and Laser Technology, pp. 137-142.

"Solid-State Laser Engineering", by Koechner published by Springer-Verlag 1976.

Chapter 6 of a book entitled "Fiber Optics Devices and Systems", by Peter Cheo published by Prentice-Hall, Inc. 1985.

"Glass Lasers", by Snitzer published in Proceedings of the IEEE, vol. 54, No. 10, Oct. 1966 at pp. 1249-1261.

"Glass Lasers", by Young published in the Proceedings of the IEEE, vol. 57, No. 7, 1969 at pp. 1267-1289.

"Transmission Properties of Circular Dielectric-Coated Metallic Waveguides for Infrared Transmission", by Miyagi et al., published in SPIE, vol. 484 of *Infrared Optical Materials and Fibers III*, 1984.

"Low Power (1KW and Below) Laser Welding", by VanderWort, published in *The Industrial Laser Handbook*, pp. 58-67.

LONG WAVELENGTH NDYAG LASER

BACKGROUND AND SUMMARY OF THE INVENTION

The present invention relates to lasers, and more particularly to a long wavelength Neodymium Yttrium Aluminum Garnet (NdYAG) laser which may be operated in either a surgical cutting or coagulating mode.

The use of lasers in surgery and medicine is expanding very rapidly to the point where lasers have become important surgical and therapeutic tools. There are, for example, $CO_2$ lasers used in surgical procedures to produce a scalpel-like incision, and NdYAG lasers, heretofore of little use for cutting, which are utilized to cauterize large blood vessels such as are involved in stomach hemorrhages or for destroying tumors in the bladder.

Medical applications for NdYAG lasers have been developed since there is a region of the light spectrum, in the red and near infrared, where human tissue is transparent. This region lies between the visible, where chromophores such as hemoglobin are strongly absorbing, and infrared, where water within tissue is absorbing, and is often referred to as a tissue "window". Light from the NdYAG laser which typically radiates at 1.06 micrometers is in the near infrared and falls within this window. When light from the NdYAG laser strikes most tissue it will be transmitted and scattered to a typical depth of about 1 centimeter before the intensity is too low to have therapeutic effect. If the laser is sufficiently powerful, deep in-situ heating of tissue is possible resulting in, for example, vessel shrinkage and associated cauterizing effects and deep coagulation necrosis.

Due to its cauterizing laser action at 1.06 micrometers, the NdYAG laser has found little use for surgical cutting but instead has been heretofore limited to the above noted types of therapeutic uses. Additionally, since the beam from an NdYAG laser can readily be coupled to and transmitted by a flexible fiber optic cable, the beam may be passed along a gastroscope or coupled through a cystoscope. The NdYAG laser can hence be easily used within the body without open surgery.

On the other hand, the $CO_2$ laser radiates in a far infrared part of the spectrum which is strongly absorbed by tissue water. When this laser is focused onto tissue it causes tissue vaporization since the radiation is absorbed by water in the first few layers of cells which are heated to the point of explosive vaporization. The cellular layers are vaporized away and the focused beam "cuts" into the surface to make a scalpel-like incision until the beam is interrupted. The $CO_2$ laser is used as a "blood free" knife since small vessels adjacent the incision are cauterized by the laser. Additionally, laser incisions appear to have unusual propensity for healing. For example, cold knife incision of skin tumors will result in ulceration, whereas laser vaporization of these tumors result in clean reepithelialization. Unfortunately, the $CO_2$ laser will not propagate along flexible fiber optic cables so that beam delivery must be through an awkward combination of tubes and mirrors.

Research is presently being performed to develop $CO_2$ laser fibers which would permit endoscopic laser surgery. However, because of the limited hemostatic property of the $CO_2$ laser, possible complications arising from vessel performation during endoscopic $CO_2$ laser surgery, has limited the usefulness of this research. Therefore it is desirable to develop ways to make a NdYAG laser beam, which will propagate along a quartz fiber, cut tissue. If it were possible to operate the NdYAG laser either in a cutting or coagulating mode, then endoscopic surgery could be performed without fear of complications from blood loss.

The wavelength of conventional NdYAG lasers falls at 1.06 micrometers in a region of very weak water absorption. The NdYAG laser, however, also typically has a transition around 1.32 micrometers and a very low gain laser transition around 1.44 micrometers. This latter wavelength coincides with a strong water absorption band, and light at 1.44 micrometer wavelength is absorbed by water after passing only about 0.3 millimeters into the water. In contrast the penetration distance of light into water is about 10 cm for light in the wavelength range of 1.32 micrometers and 100 cm for light in the wavelength range of 1.06 micrometers. Therefore, since animal tissues are comprised mainly of water, if a powerful focused laser beam at 1.44 micrometer wavelength were to strike tissue then it is possible that the tissue surface will heat and evaporate away in much the same way as a $CO_2$ laser beam provides a scalpel-like incision as described above.

Unfortunately, Nd, which is suspended in a YAG crystal host and which is also the atom responsible for laser action from NdYAG, is absorbing in the spectral region of 1.44 micrometers. NdYAG is effectively 100% transparent in the wavelength regions of 1.06 micrometers where NdYAG has hitherto been used as a laser medium. However, laser oscillation around 1.44 micrometers is more difficult partly because self absorption of the Nd occurs at 1.44 micrometers due to an absorption on the electronic transition $^4I_{9/2} \rightarrow\ ^4I_{15/2}$, which is centered at 1.485 micrometers. Though this absorption may be minimized by using crystal material with Nd concentration as low as one half precent of the total NdYAG weight it is obviously not possible to eliminate self absorption in this way. Alternately self absorption by Nd at 1.44 micrometers could be reduced by cooling the laser crystal since self absorption only occurs because of thermal spreading of the absorption line. However, cryogenic cooling is impractical in most NdYAG applications.

Self absorption by a laser material is usually grounds for dismissing a potential laser transition. For the 1.44 micrometer line in NdYAG this is particularly true because the gain around 1.44 micrometers is very low and the 1.44 micrometer transition must compete for laser oscillation with the 1.06 micrometer transition which has typically several hundred times more gain. The NdYAG laser has thus tranditionally been considered a very unlikely candidate for high powered emission at 1.44 micrometers.

One report in the literature describes operation by using selective optics which suppress laser oscillation at 1.32 micrometers and 1.06 micrometers. However, the continuous output power reported from a 100 watt 1.06 micrometer laser was insignificantly small at 1.44 micrometers and was about 0.4 watts. The reason for this low output power is the very low gain or amplification of the laser at 1.44 micrometers so that in order to achieve laser oscillation the transmitting resonator mirror must be highly reflecting. The report describing laser action at 1.44 micrometers describes a transmitting mirror which transmits about 0.5% and reflects 99.5%. However, since the laser rod will typically absorb 10% of a 1.44 micrometer laser beam passing through it, each time light is reflected around the reasonator the laser beam loses 2 times 10% or 20% by absorption in the laser rod and only 0.5% by transmission through the output transmission mirror. As a consequence, the laser power is lost in absorption rather than passing through the output transmission mirror to form a useful laser beam.

It has been discovered, however, that it is possible to obtain a powerful beam of light from NdYAG laser at 1.44 micrometers wavelength if the laser mirrors are designed to prevent laser action from occurring at high gain laser transitions such as at 1.06 and 1.32 micrometers, and the laser drive or lamp is repetitively pulsed at high transient power rather than running the laser drive or lamp with continuous current. Under these two conditions, it is possible to obtain substantial average laser power from a NdYAG laser at 1.44 micrometers. The beam from such a laser, when focused onto tissue, will evaporate the tissue and result in a scalpel-like incision.

It has been discovered that under a repetitively pulsed drive lamp condition, it is possible to achieve laser oscillation with an output transmission mirror which is, for example, 20% transmitting and 80% reflecting. As a result, if laser rod absorption for each cycle of light is 20%, it has been found that the laser power is divided equally between the losses in the rod and as useful output power. It is believed that under conditions of intense pulsed lamp light the gain or amplification of light in the laser rod becomes very high and that laser oscillation will occur even though the losses from combined rod absorption and mirror transmission can be 50% for each cycle of light through the laser resonator. Additionally, it appears that oscillation at a wavelength of 1.06 and 1.32 micrometers will remain suppressed by laser resonator selectivity under these conditions. Thus, it is believed that the high peak power pulses of the laser drive permits laser oscillation at 1.44 micrometers with a relatively high transmission output mirror which reduces the detrimental effect of intrinsic absorption in the laser rod at 1.44 micrometers.

Thus, the combined use of a frequency selective laser cavity together with a repetitively pulsed high peak current lamp will result in an average laser power of at least 40 watts at 1.44 micrometers from a laser typically designed to produce 100 watts at 1.06 micrometers. The technique developed for producing the NdYAG laser cutting beam has been to shift the wavelength of laser radiation from 1.06 micrometers, where tissue is transparent, to 1.44 micrometers in which tissue water absorption is strong. As a result of shifting the wavelength of laser radiation from 1.06 micrometers to 1.44 micrometers, the penetration distance of the laser beam in tissue falls from about 1.0 centimeter to about 0.3 millimeters. Hence, a focused laser beam at 1.44 micrometers is absorbed in most tissues to produce a "slice" approximately ¼ of a millimeter deep and the tissue at the focus vaporizes away in much the same manner as with the $CO_2$ laser. The beam at 1.44 micrometers may thus be alternated with a beam at 1.06 micrometers by selectively mounting appropriate mirrors at the ends of the laser rod, and by providing appropriate circuitry to convert the pulsed lamp output to a continuous lamp output.

Additionally, even though the 1.44 micrometers NdYAG beam falls in the absorption band in quartz caused by trapped water, some quartz fiber is almost water free, and consequently, it is possible to transmit both a coagulating 1.06 micrometer beam and a cutting 1.44 micrometer beam through the same quartz fiber. Thus, the NdYAG laser of the present invention may be adapted to various types of endoscopes and operating microscopes for use in various surgical and therapeutic applications.

BRIEF DESCRIPTION OF THE DRAWING

The drawing illustrates the best mode presently contemplated of carrying out the invention.

In the drawing.

DESCRIPTION OF THE PREFERRED EMBODIMENT

Figure 1:
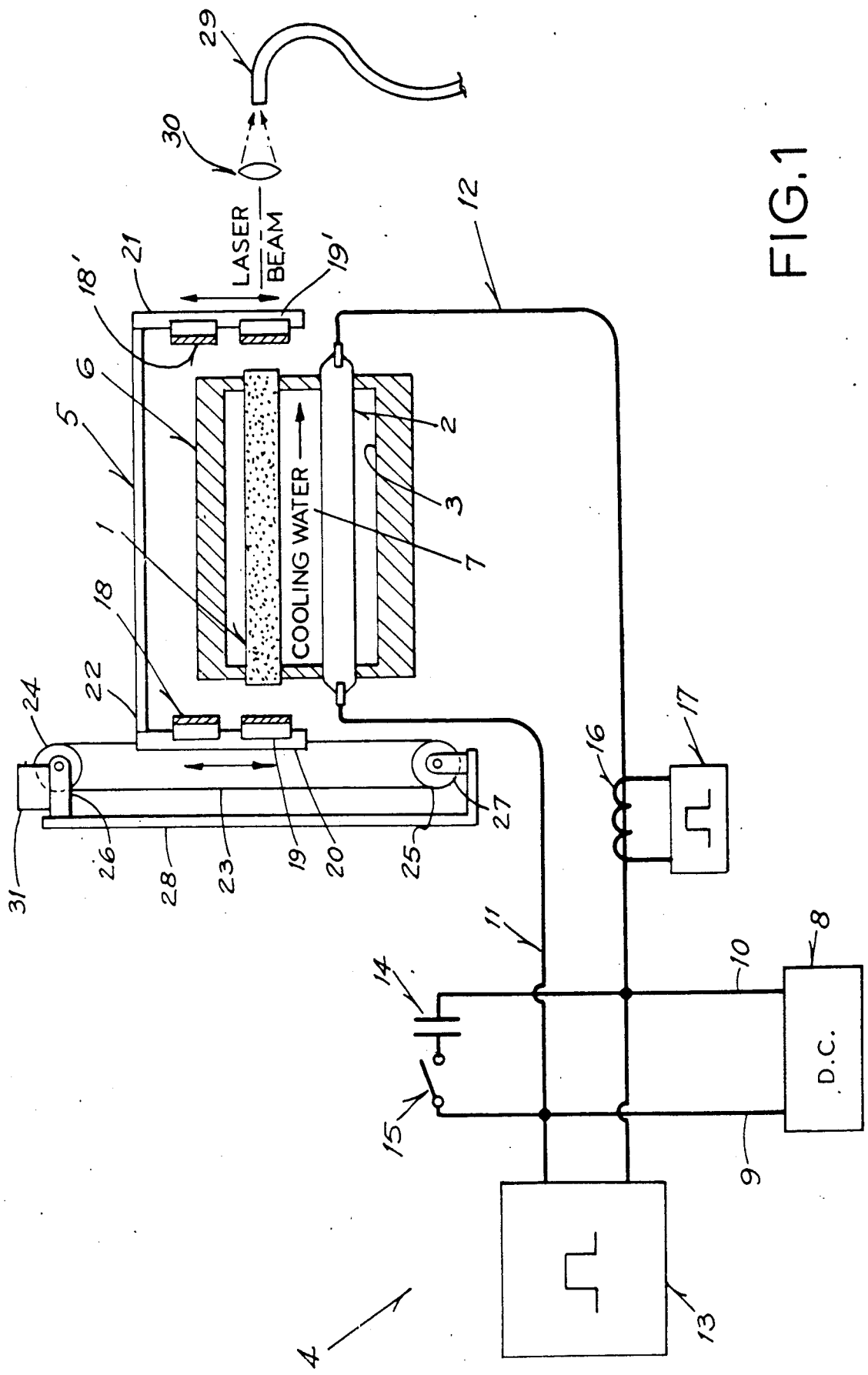
FIG. 1 is a schematic diagram of a NdYAG laser incorporating the principles of the present invention.

Referring now to FIG. 1, there is illustrated a NdYAG laser constructed to provide a beam of light at 1.44 micrometer wavelength to operate in a cutting mode, or alternately, to provide a beam of light at 1.06 micrometer wavelength to operate in a coagulating mode. As shown, the NdYAG laser includes a laser rod 1 and drive lamp 2 mounted within a laser cavity 3, a drive mechanism 4 for pulsing lamp 2 or alternately driving lamp 2 with a continuous output, and a mirror carousel 5.

Laser rod 1 is composed of a conventional NdYAG material having a doping of around 1% by weight of the YAG host medium. Conventional NdYAG material is composed of a triply-ionized neodyium ion, incorporated into a crystalline or glass host structure. The most common crystal host structure, and the one preferred for the composition of laser rod 1, is yttrium aluminum garnet, generally known by its acronym "YAG". YAG is a hard and brittle material which is a synthetic material having a garnet like structure and the chemical formula $U_3Al_5O_{12}$. Although YAG is the preferred crystalline host material for neodynium, alternatives to YAG that may be utilized for laser rod 1 are yttrium lithium fluoride, generally known as YLF, and yttrium aluminate, generally known at YALO. Additionally, since crystal growth problems limit the maximum length of YAG rods to about 10 centimeters for most practical appications, glass may also be utilized as the host structure for discs or rods of laser material which must be larger than standard YAG rods to provide higher output power and energy.

Laser rod 1 is preferably about 10 centimeters in length and about 0.6 centimeters in diameter. Opposite ends of rod 1 are polished and coated in the conventional manner for minimum reflectively at a wavelength of approximately 1.32 micrometers. It should be particularly noted that it is desirable to utilize a laser rod 1 having minimum absorptivity of light. At 1.44 micrometers wavelength absorptivity is 1% per centimeter for a typical NdYAG laser rod so that a 10 centimeter long rod placed within cavity 3 will introduce a loss of about 20% into the laser resonator or mirrors.

Laser cavity 3 is formed within a reflective housing 6 of elliptical cross-section thus forming an elliptical laser cavity 3. Housing 6 is composed of copper with a gold coating on its interior cavity surface to act as a lamp light reflector. Metal coated glass may also be used as a laser cavity. Lamp 2 used to "pump" the laser and laser rod 1 lie along the two foci of the elliptical interior shape of cavity 3, as is conventional. Water cooling of the laser rod and lamp is provided by flowing deionized water through tubes surrounding both rod 1 and lamp 2, and it is schematically illustrated in FIG. 1 by the arrow 7. These flow tubes may be of quartz or they may be of samarium doped glass. Cooling water of at least 4 gallons per minute is typically provided within cavity 3.

Several other types of cavity configurations are also possible for use with the present invention. As noted above, the preferred arrangement is to place the lamp 2 and rod 1 at the two foci of elliptical cavity 3, and let the geometric properties of the reflective elliptical cavity 3 carry the pump light from lamp 2 to rod 1. Another approach is to put lamp 2 next to rod 1 in a "close coupling" configuration wherein the rod and lamp are immediately adjacent each other in the center of a cylindrical reflective cavity. Additionally, two lamps and a rod can be put into a dual elliptical cavity, which in cross section looks like two overlapping ellipses with the lamps at the two foci of the housing and the rod at the focus they share.

Drive lamp 2 is preferably a krypton arc lamp which has been found to be superior for laser action at 1.44 micrometers. Typically, lamp 2 has an internal diameter of 7 millimeters and a length of 10 centimeters. A lamp of these dimensions has been found to withstand the necessary high repetition rate of pulse current required for the instant operation. Lamp 2 is typically operated in a pulse mode for laser operation at 1.44 micrometers with an applied voltage of about 600 volts for a period of 1 millisecond and at a repetition rate of 30 to 100 pulses per second. Additionally, the above described krypton lamp 2 has been found to be adequate for operation with a continuous current of up to 50 amps for continuous operation at a wavelength of 1.06 micrometers. Although lamp 2 is preferably a krypton arc lamp, other light sources such as a tungsten lamp or other arc lamp shining continuously, or a Xenon flash lamp producing pulses of light may also be utilized.

Drive lamp 2, typically termed a "pump lamp", emits a broad spectrum of light, but neodynium ions, regardless of host, tend to absorb most strongly in a narrow range of wavelengths around 0.7 to 0.8 micrometers. Absorbing photons in this range raises the neodynium ions from the ground state to a high energy level, from which they decay to a metastable level which produces fluorescent emission at several wavelengths, namely 1.06 micrometer wavelength, 1.32 micrometer wavelength, and 1.44 micrometer wavelength. Laser action will occur on the 1.06 micrometer emission band, since the laser gain is highest for this wavelength, unless the laser mirrors or optics are made wavelength selective so as to suppress 1.06 micrometer laser oscillation.

Lamp 2 is driven by a d.c. power source 8 of conventional design which is connected to the driving electronics by lines 9 and 10. This d.c. power source provides a current of typically 10 amps to the drive lamp which is known in the laser art as a simmer current. The simmer current maintains the lamp 2 in a conducting state between current pulses. Lines 9 and 10 are connected to cables 11 and 12 respectively which in turn are connected at one of their ends to lamp 2 and at their other ends to a solid state switching circuit or "chopper" 13. The "chopper" circuit 13 drives lamp 2 at 600 volts with a typical current of 300 amps for 1 millisecond at a repetition frequency of 30 pulses per second to typically obtain an average power of 50 watts at 1.44 micrometers wavelength. Circuit 13 will also operate at a repetition rate of typically one kilohertz for continuous operation of lamp 2. Under continuous operation it is necessary to average the current flow by switching a smoothing filter into the circuit. For this purpose, the 1 khz pulse train from chopper circuit 13 is averaged by using a capacitor 14 having a rating of 0.009 Farads mounted in parallel to lamp 2. Additionally, a relay 15 switches the smoothing capacitor 14 into and out of the circuit depending upon whether one desires pulsed operation or continuous operation. For example, the average current for continuous operation is typically 45 amps developing 100 watts of laser output power at 1.06 micrometer wavelength. FIG. 1 also illustrates that lamp 2 is started in the usual manner by a triggering transformer 16 which is a standard series high voltage pulse transformer having its own independent driving electronics 17, which is standard practice.

Mirror carousel 5 is comprised of a sliding mirror mount containing two or more sets of laser mirrors 18, 18' and 19, 19', mounted in conventional laser mirror adjusting mechanisms 20, 21 respectively. Carousel 5 also includes a linking member 22 which interconnects adjusting mechanisms 20 and 21 so that each set of mirrors 18, 18' or 19, 19' move in tandem. Carousel 5 is driven between a first position wherein mirrors 18, 18' form a laser cavity with rod 1 to produce a 1.06 micrometer wavelength beam, and a second position wherein mirrors 19, 19' are adjacent the ends of rod 1 to produce a laser beam of 1.44 micrometer wavelength. As a means for driving carousel 5 between its alternate positions, FIG. 1 illustrtes that adjusting mechanism 20 may be attached to a cable or other line 23 trained about a pair of sheaves 24 or 25 rotatably mounted on brackets 26 and 27, respectively, which in turn are mounted on a support member 28. As shown, sheave 24 is driven by an electric motor 31 to move carousel 5 upwardly or downwardly to properly locate either laser mirrors 18, 18' or 19, 19' adjacent the end of rod 1 to develop either 1.06 or 1.44 micrometer wavelength laser beams.

The mirrors used for achieving laser action at 1.44 micrometers must be reflecting at 1.44 micrometer but be as transparent as possible at 1.06 micrometer and 1.32 micrometer. For example, those mirrors used to achieve high average power at 1.44 micrometer are preferably comprised of one mirror with 100% reflectivity at 1.44 micrometer, 50% reflectivity at 1.32 micrometer and 30% reflectivity at 1.06 micrometer, and another mirror with 80% reflectivity at 1.44 micrometer, 20% reflectivity at 1.32 micrometer and 5% reflectivity at 1.06 micrometer. In addition, a transmitting silicon window 1 cm thick which is anti-reflection coated at 1.44 micrometers, may be placed adjacent to the laser rod and inside the laser resonator. Silicon is approximately 100% absorbing at 1.06 micrometers and serves to suppress laser oscillation at 1.06 micrometer wavelength. The addition of this element will suppress laser oscillation even if the laser mirrors are highly reflecting at 1.06 micrometer wavelength. Other elements such as prisms or diffraction gratings could be used for wavelength selection. Such mirrors mounted adjacent to the ends of laser rod 1 result in a laser output with an average power of at least 40 watts and a peak power close to 1000 watts.

A quartz fiber 29 may also be utilized for transmitting the 1.44 micrometer laser beam. Fiber 29 is typically a 600 micrometer core quartz fiber. Even though quartz is known to have absorption caused by trapped water in the region of 1.44 micrometers, anhydrous quartz fiber is almost water free so that negligible absorption occurs resulting in the ability to transmit both the coagulating 1.06 micrometer beam and the cutting 1.44 micrometer through the same quartz fiber 29.

The laser beam from laser rod 1 is focused onto quartz fiber 29 by a lens 30. Lens 30 is anti-reflection coated at 1.06 and 1.44 micrometers and has a focal length of approximatley 2 centimeters, which is conventional.

Various modes of carrying out the invention are contemplated as being within the scope of the following claims particularly pointing out and distinctly claiming the subject matter which is regarded as the invention.

I claim:

1. A long wavelength neodymium laser, comprising:
    a housing including a reflective hollow optical cavity;
    a laser rod mounted in said optical cavity, said laser rod composed of a crystalline or glass host structure having neodymium doping;
    a pump lamp mounted in said optical cavity adjacent to said laser rod, said pump lamp providing a source of light for transfer to said laser rod;
    drive means including circuit means for driving said pump lamp to produce intermittent pulses of light from said pump lamp; and
    wavelength selective resonator means for providing maximum reflection at about 1.44 μm wavelength and minimum reflection at other wavelengths to allow laser oscillation at about 1.44 μm.

2. The laser of claim 1 wherein said wavelength selective resonator means comprises light reflectors with coating providing maximum reflection at about 1.44 μm and minimum reflection at all other wavelengths.

3. The laser of claim 1 wherein said wavelength selective resonator means comprises a silicon window coated for maximum transmission at about 1.44 μm and placed adjacent to one end of the said laser rod.

4. The laser of claim 1 wherein said wavelength selective means comprise a refractive prism placed adjacent to said laser rod.

5. The laser of claim 1 wherein said wavelength selective resonator means comprises a light reflector with a diffracting surface and oriented so as to reflect light at about 1.44 μm along the axis of the said laser rod.

6. The laser of claim 1 wherein said host structure is yttrium aluminum garnet.

7. The laser of claim 1 wherein said pump lamp is a krypton arc lamp.

8. the laser of claim 1 wherein said drive means provides an applied voltage of about 600 volts for a period of about 1 millisecond at a repetition rate of about 30–100 pulses per second.

9. The laser of claim 1 further including means for converting said drive means from a pulse output to a continuous output.

10. The laser of claim 9 wherein said converting means includes a capacitor connected in parallel with said pump lamp, and switch means for switching said capacitor into and out of said circuit means.

11. The laser of claim 9 further including a second laser resonator comprising mirrors providing maximum reflection at 1.06 micrometer wavelength and minimum reflection at other wavelengths, said first and second laser resonators mounted in spaced relation to each other, mounting means for adjustably mounting said mirrors, and moving means for moving said respective first and second laser resonator to a location adjacent opposite ends of said laser rod.

12. The laser of claim 11 further including a fiber optic conductor and a lens located adjacent one of said pairs of mirrors to focus a laser beam of light emitting from said laser rod onto said conductor.

13. The laser of claim 12 wherein said conductor is a quartz fiber optic conductor.

14. The laser of claim 1 in which the wavelength selective means has transmission losses at about 1.44 μm that are at least equal to the absorption losses in the rod.

15. The laser of claim 1 in which the wavelength selective means has transmission losses at about 1.44 μm that are greater than the absorption losses in the rod.

16. The laser of claim 1 in which the wavelength selective resonator means reflects about 80% of the radiation at about 1.44 μm, and the neodymium doping level of the host structure is such that the absorption losses due to neodymium are equal to or less than 20%.

17. The laser of claim 1 in which said wavelength selective means comprises mirrors spaced from the opposite ends of said rod and providing maximum reflection at about 1.44 μm wavelength and minimum reflection at other wavelengths.

18. The laser of claim 1 wherein said wavelength selective means comprises a light reflector with a diffracting surface and oriented so as to reflect light at about 1.44 μm along the axis of the laser rod.

19. A method of producing a high power laser beam from a neodymium laser at about 1.44 μm wavelength, comprising the steps of:
    applying intermittent pulses of light from a pump lamp to a laser rod composed of a crystalline or glass host structure having neodymium doping; and
    positioning a frequency selective laser resonator adjacent to said laser rod, so as to produce laser oscillation at about 1.44 μm, said resonator including wavelength selective means for providing maximum reflection at about 1.44 μm wavelength and minimum reflection at other wavelengths.

20. The method of claim 19 wherein said pump lamp is driven at a voltage of about 600 volts for a duration of 1 millisecond at a repetition rate of about 30–100 pulses per second.

21. The method of claim 19 further including the step of transmitting the laser through a fiber optic conductor.

22. The method of claim 19 further including the step of alternating a second frequency selective laser resonator adjacent to said laser rod with said laser resonator, said second laser resonator allowing oscillation at 1.06 micrometers laser.

23. The method of claim 19 in which the maximum reflection of the wavelength selective means at about 1.44 μm is about 80%, and the neodymium doping level of the host structure is such that the absorption losses due to neodymium are equal to or less than 20%.

* * * * *

UNITED STATES PATENT AND TRADEMARK OFFICE
CERTIFICATE OF CORRECTION

PATENT NO. : 5,048,034

DATED : September 10, 1991

INVENTOR(S) : John Tulip

It is certified that error appears in the above-identified patent and that said Letters Patent is hereby corrected as shown below:

Column 7, lines 53-56, delete claim 10

Signed and Sealed this

Twenty-sixth Day of January, 1993

Attest:

STEPHEN G. KUNIN

Attesting Officer

Acting Commissioner of Patents and Trademarks